INVENTOR.
ELTON S. SAVAGE

BY
D. M. Maxapell
ATTORNEY.

Oct. 24, 1967   E. S. SAVAGE   3,349,030
PROCESS AND APPARATUS FOR THE CLARIFICATION
TREATMENT OF SOLIDS-CARRYING LIQUIDS
Filed Dec. 21, 1964   5 Sheets-Sheet 2
FIG. 3
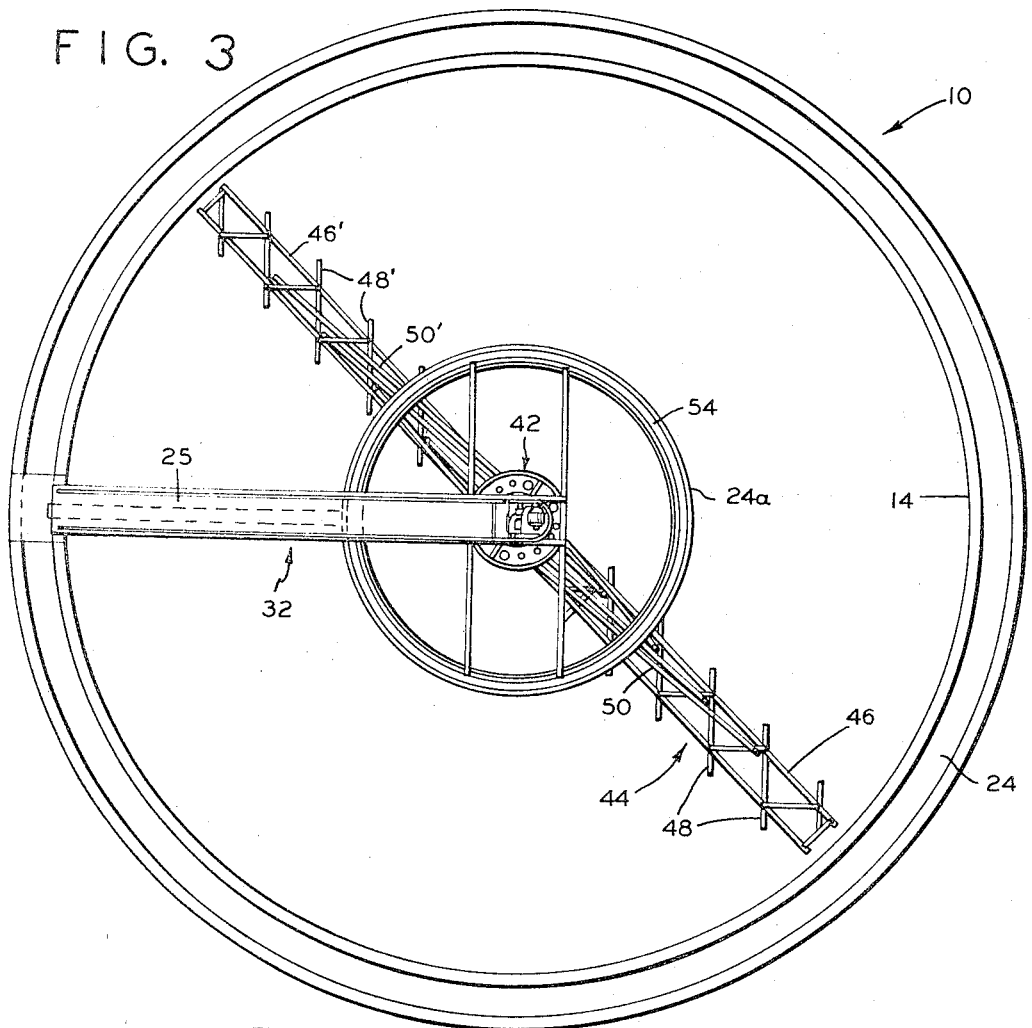
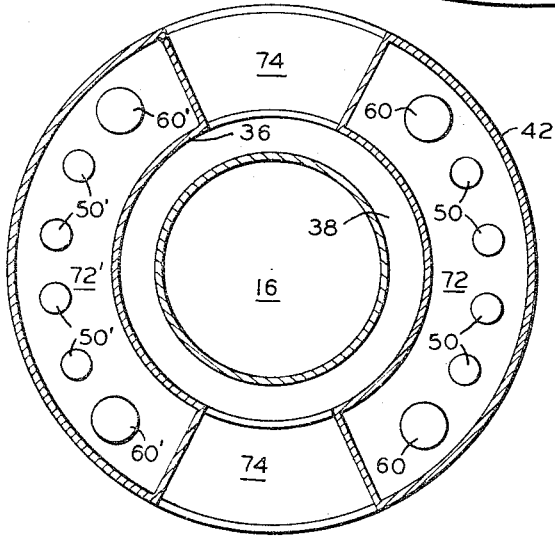
FIG. 2
INVENTOR.
ELTON S. SAVAGE
BY
ATTORNEY.

INVENTOR.
ELTON S. SAVAGE
BY
ATTORNEY.

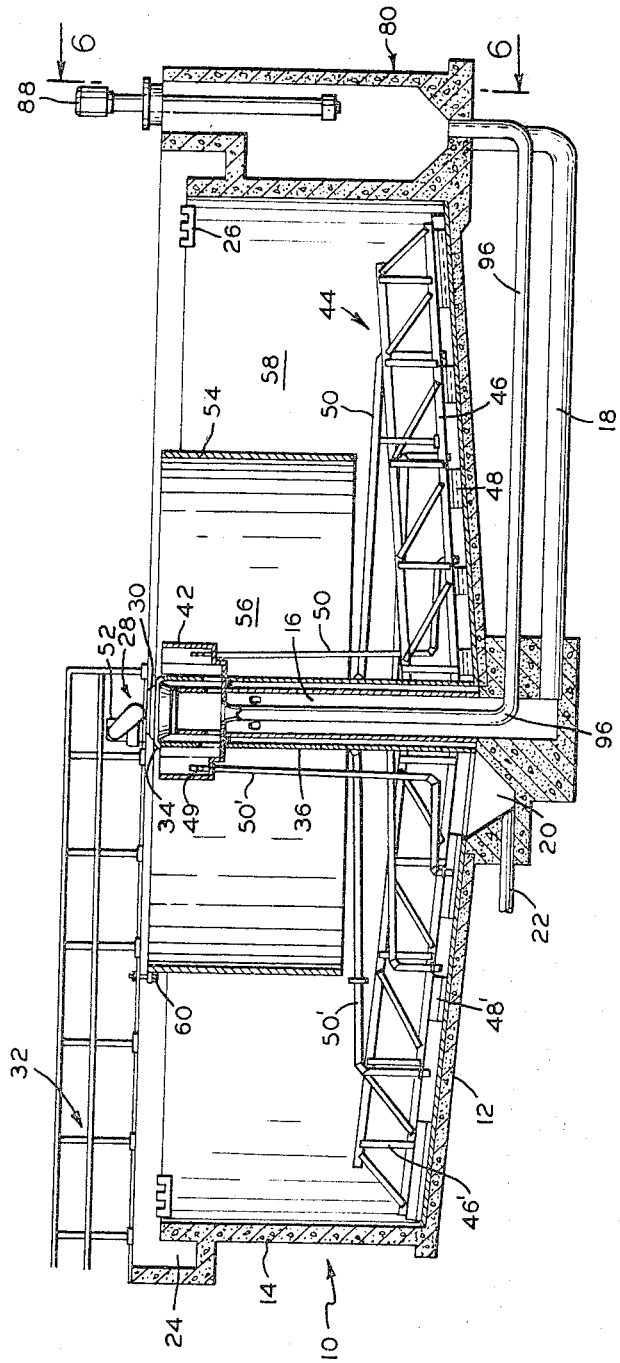

Oct. 24, 1967　　　　　　　E. S. SAVAGE　　　　　　3,349,030
PROCESS AND APPARATUS FOR THE CLARIFICATION
TREATMENT OF SOLIDS-CARRYING LIQUIDS
Filed Dec. 21, 1964　　　　　　　　　　　　　　5 Sheets-Sheet 5

INVENTOR.
ELTON S. SAVAGE
BY
ATTORNEY.

United States Patent Office 3,349,030
Patented Oct. 24, 1967

3,349,030
PROCESS AND APPARATUS FOR THE CLARIFICATION TREATMENT OF SOLIDS-CARRYING LIQUIDS
Elton S. Savage, Ridgefield, Conn., assignor to Dorr-Oliver Incorporated, Stamford, Conn., a corporation of Delaware
Filed Dec. 21, 1964, Ser. No. 419,633
23 Claims. (Cl. 210—46)

This invention relates to improvements in the clarification treatment of solids-carrying liquids and more particularly to an improved process and apparatus for separating solids from liquids by subjecting said solids-carrying liquids to flocculation and clarification treatment in the presence of previously treated solids.

An example wherein this invention finds particular application is in the clarification treatment of surface waters to remove suspended and dissolved solids which may impart turbidity, color, taste and an odor to the water.

The process and apparatus of this invention is especially suited when treating lightly loaded waters as "pretreatment" unit, in preparing the aforesaid turbid waters for further treatment such as filtration. The type and extent of pretreatment depends upon the quality of the raw water and the purpose for which the treated water will be used.

When water is for industrial purposes, filtration may not be required and pretreatment is the only treatment necessary. On the other hand, when the water is for municipal purposes the pretreated water is generally subjected to further treatment.

Other examples wherein this invention finds application are in the softening treatment of hard water and in the treatment of waste waters generally.

Clarification of solids-carrying liquids is generally conducted by introducing the liquid to be clarified into a settling tank, generally called a clarifier, in which the liquid is held in a quiescent state for a sufficient period of time to permit the solids to settle out and thereafter the settled solids or sludge are raked towards a sludge outlet while the clarified liquid is removed as overflow.

It is well known that the settleability of finely divided solids suspended in said liquids may be improved by flocculating said solids prior to settlement and various apparatus have been proposed for incorporating in one unit both a flocculating compartment in which the liquid is maintained in a state of agitation and a settling compartment in which the flocculated solids are allowed to settle in a quiescent zone.

It is also well-known that the flocculating and therefore the settling characteristics of finely divided solids may be enhanced and therefore the over-all efficiency of the unit improved by mixing a portion of previously settled solids or sludge with the fresh feed prior to introducing said feed into the flocculating zone.

Various tank designs have been proposed for the taking advantage of these well-known facts, a typical example of which is described in U.S. Letters Patent 2,669,-357.

Briefly, the prior art apparatus as exemplified in this patent utilizes a combination flocculation-clarification treatment tank in which the raw liquid to be treated is continuously fed into said tank through a hollow center column provided with ingress ports at its lower end to permit a portion of the previously settled sludge to be recirculated into the raw feed and egress ports at its upper end through which the feed liquid is discharged into the flocculation compartment. In the flocculation compartment, the feed liquid is flocculated and the flocculated material passes downwardly under a cylindrical partitioning wall, dividing the flocculation compartment from the clarification compartment, into the surrounding clarification compartment wherein the flocculated solids are permitted to settle while the clarified liquid overflows a peripheral discharge launder.

Raking means, operating on the tank bottom, rake the settled sludge towards the center column where a portion of the solids are recirculated into the feed liquor while the rest of said solids are deposited into a sump and discharged from the tank.

While the foregoing apparatus has proven to be an effective means for removing settled solids with fresh feed, it suffers from the disadvantage that because of the countercurrent flow effected between the outwardly moving flocculated suspension from the flocculation compartment, and the inwardly moving settled solids raked on a tank floor, there is a tendency for some of the settled solids, especially the light, relatively small solids, to be resuspended in the clarification compartment. Eventually, these light solids leave the tank with the clarified effluent thereby reducing the efficiency of the over-all system.

Furthermore, due to the shear forces created by this countercurrent movement, there is a tendency for the large flocculated material to break up.

A further disadvantage of the prior art apparatus is that there is also a tendency for the flocculated material moving downwardly in the flocculation compartment to pass directly into the ingress ports in the center column thereby reducing the amount of settled solids which can be recirculated into the flocculation compartment.

It is therefore a general object of the present invention to provide an improved process and apparatus for clarifying solids-carrying liquids wherein the disadvantages of the prior art methods are overcome.

It is another object of the present invention to provide a process and apparatus whereby the successive steps of flocculation and clarification are more effectively performed.

In the design of waste and water treatment plants, flocculation is a critical phase of the operation and efficient flocculation is mandatory for efficient plant operation. With proper flocculation, excellent water can be produced even under conditions of heavy overloading of the equipment.

The process requirements for good flocculation involve several separate and distinct operations which, very briefly, may be summarized as follows: (a) production of a flocculant precipitate into which the suspended particulate matter can be incorporated; (b) neutralization of the electrokinetic charge, normally acquired by suspended matter due to the adsorption of ionic constituents from water and waste solutions; and (c) contacting the floc particles with raw water solids and with each other to produce large dense flocs which settle rapidly.

The latter operation is sometimes referred to as the solid-contact principle.

When flocculation and clarification are performed in a combination treatment unit of the solid contact type, such as in pretreatment for removal of suspended solids, it has been found that the overall efficiency of the treatment unit is improved by removing the separated solids, in the sedimentation area of the combination unit, by separate conduit means.

Said separate conduit means, for removing solids from sedimentation area, permit higher solids concentrations to be maintained in the flocculation zone, as well as in the clarification zone, thereby, not only improving flocculation but also improving clarification efficiency by reducing the detention time of the sludge in the clarifier and avoiding build-up of solids. Furthermore, because of the high solids concentration maintained in the system, the solids in the clarification compartment have a tendency to settle as a consolidated mass, known as "in line" or "zone" settling.

In "zone" settling, particles of different sizes, in a concentration layer, settle at the same rate leaving a sharp boundary line between the settling suspension and the supernatant.

Furthermore, with higher solids concentration in the flocculation zone it has also been found that the need for mechanically induced flocculation is reduced to a minimum, and in most cases, completely eliminated.

The process and apparatus of this invention also lends itself to a rapid mixing of recirculated solids with incoming feed and for efficient dispersal of treatment chemicals throughout the incoming flow.

It is therefore another object of the present invention to provide an apparatus wherein rapid mixing, flocculation and clarification are effected in one unit.

Another object of the present invention is to provide an improved means for transferring flocculated material from the clarification compartment to the flocculation compartment without breaking the flocs during the transfer.

It is still another object of the present invention to provide a system wherein the settled sludge solids may be rapidly and selectively recirculated from the clarification compartment to the flocculation compartment.

A further object of the present invention is to maintain high solids concentration in the flocculation compartment thereby reducing and in some instances eliminating the need for mechanical agitation in the flocculation compartment.

It is still a further object of the present invention to provide means for maintaining high solids concentration in the system to effect "zone" settling.

This invention will be better understood by referring to the accompanying drawings in which: FIG. 1 is a vertical sectional view of one form of the apparatus of the present invention showing recirculation of the settled flocculated material through a Venturi-like constriction in the center column:

FIG. 2 is a view taken along lines 2—2 of FIG. 1;

FIG. 3 is a plan view of the apparatus of FIG. 1;

FIG. 5 is a vertical sectional view of another embodiment of the apparatus of the present invention showing the recirculation of settled flocculated material through a recirculation well;

In the description which follows like reference numerals in the several figures designate similar elements.

Figure 1:
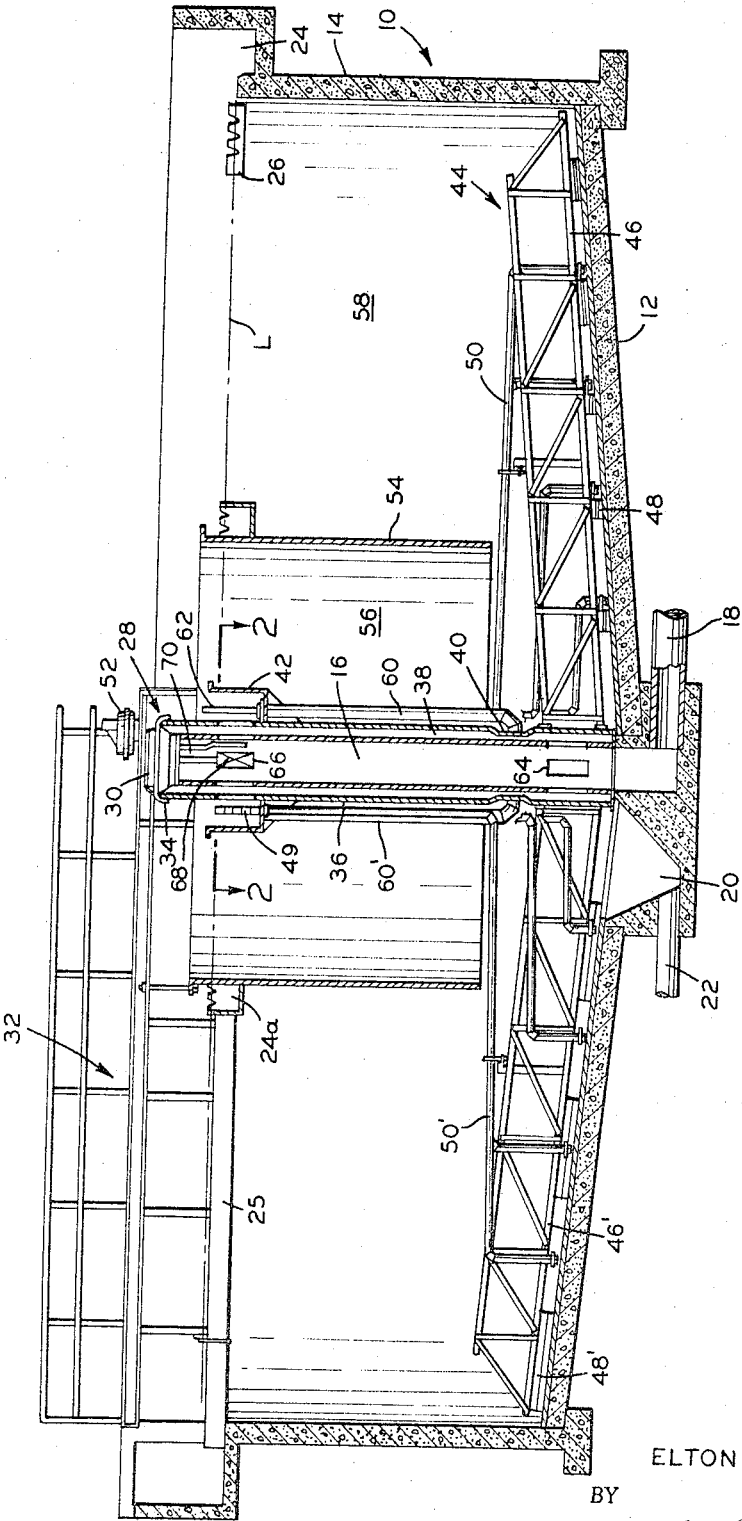

Referring to the drawings, particularly FIGS. 1 and 5, the apparatus comprises preferably a round concrete tank 10 having a gently sloping bottom 12, a vertical peripheral wall 14 and hollow stationary column 16.

The tank is provided with an influent feed conduit 18, communicating with the interior of the center column, through which the raw liquor to be treated is introduced into the tank, an off-center sludge discharge sump 20 having a sludge withdrawal conduit 22 and an overflow launder 24 for receiving and discharging clarified effluent from said tank.

Preferably associated with said overflow launder in a weir plate 26 which controls the liquid level, indicated by line L, in the tank.

Mounted on the top of column 16 is an operating platform, indicated generally by reference numeral 28, comprising a non-rotatable table 30 which supports one end of a conventional walkway 32, the other end of said walkway being supported on the peripheral wall 14, and a turntable 34 which supports, preferably, a column 36 generally surrounding said stationary column 16 and rotated by said turntable 34.

Mounted around the upper end of column 36 and rotatable therewith is a doughnut-shaped sludge launder 42 whose function will be described more fully hereinafter.

Mounted on the lower end of column 36 and rotatable therewith is a rotary raking structure 44 for conveying the settled sludge solids on the tank bottom to sump 20.

More particularly, the raking structure comprises a pair of radial extending raking arms 46, 46' carrying sediment raking blades 48, 48' which when the raking structure is rotated, act to progressively convey the settled solids from the outlying annular zones in the tank bottom towards the center column where they are collected in sump 20 to be withdrawn by conduit 22.

Supported on rake arms 46, 46' and rotatable therewith are a plurality of sludge uptake conduits 50, 50' respectively, the lower or inlet ends of which terminate at a predetermined position above the tank bottom, while the upper or outlet ends of said uptake conduits open into launder 42.

Sludge uptake conduits 50, 50' operate in concentric annular zones or sections on the tank floor and are effective for recirculating sludge from the clarification compartment to the flocculation compartment. The upper ends of said uptake conduits are provided with valve means 49 which, as shown, is preferably an adjustable ring valve for controlling the amount of sludge withdrawn from the tank floor and delivered to launder 42. Also valve 49 provides a means for selective removal of sludge from said concentric annular zones or sections on the tank floor.

As indicated above, column 36 is supported from turntable 34 such as by a suitable bearing means, not shown, and rotated by a conventional drive means, indicated generally by reference numeral 52, supported on said operating platform.

Tank 10 is also provided with a generally cylindrical partitioning or baffling wall 54 dividing the tank into an inner floccluation compartment 56 and an outer clarification compartment 58 surrounding said flocculation compartment. Baffle 54 is preferably secured to the superstructure, as indicated generally by reference numeral 69, and extends from a point above the liquid level in the tank to a point above the tank bottom so as to permit the flocculated material to flow downwardly in the flocculation compartment and radially outwardly into the clarification compartment.

Referring now specifically to the embodiment as shown in FIGS. 1, 2 and 3, column 36 which is supported from turntable 34 and surrounds column 16 defines therebetween an annular flow zone or chamber 38 wherein the incoming raw feed and recirculated sludge is mixed prior to entering the flocculation compartment 56.

Column 36 is so constructed so as to present a construction or Venturi-like section 40 in zone 38 which, as will appear more fully hereinafter, effects recirculation of previously settled sludge solids from the tank floor into the uprising stream of feed liquor in zone 38.

Leading from launder 42 into the annular flow zone 38, preferably at the point of constriction 40, is preferably a plurality of of sludge recirculation conduits 60, 60' for conveying sludge from the launder 42 into the annular zone 38.

Conduits 60, 60' are preferably provided at their upper or inlet ends with valve means 62 which provide a means for controlling the amount of sludge recirculated into the incoming feed liquor.

As shown in FIG. 2, in this embodiment, launder 42 is divided into four zones or compartments, namely, two sludge transfer zones 72, 72' accommodating the upper or outlet ends of sludge uptake conduits 50, 50', respectively, and the upper or inlet ends of sludge recirculation conduits 60, 60' respectively, and two feed passage zones, each designated by the reference numeral 74, communicating between annular zone 38 and flocculation compartment 56.

Stationary column 16 is also provided with influent outlet ports 64 located below constriction 40 in zone 38 and with adjustable influent output ports 66 located above said constriction. Adjustment of flow rates between the lower ports 64 and the upper ports 66 is effected by a sliding gate valve, indicated generally by reference numeral 68, associated with outlet ports 66 and provided with lifting rods 70 for raising and lowering said gate valve.

With the gate valve 68 in a fully opened position, the incoming feed entering through conduit 18 flows up center column 16 to the upper outlet ports 66 and is discharged into the flocculating compartment 56 through feed passage zone 74 of launder 42. (See FIG. 2.)

With the gate valve 68 in the fully closed position, the incoming feed is forced through the lower outlet ports 64, pass the Venturi section 40, up the annular zone 38 and out into the flocculation compartment 56 through the feed passage zones 74 in the launder 42.

When the gate valve 68 is partially open, part of the feed will pass through ports 64 and part of the feed through ports 66.

Treatment chemicals, if necessary, may be added to the recirculation system preferably into compartments 72, 72′ by suitable conduit means, not shown, to be dispersed in the feed liquid prior to flocculation.

Figure 6:
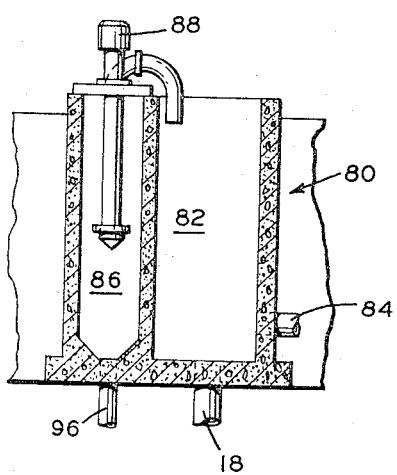
FIG. 6 is a view taken along lines 6—6 of FIG. 5.

In the embodiment as shown in FIGS. 5, 6, 7, and 8, tank 10 is provided with a sludge recirculation well 80 which, as more clearly seen in FIG. 6, consists of two zones or chambers, namely a feed chamber 82 provided with raw feed liquor conduit 84 and a sludge chamber 86 provided with a sludge recirculation pump 88, preferably a propeller type pump, for pumping previously settled solids from chamber 86 into chamber 82.

The feed mixture of raw liquor and previously settled solids, is conveyed to the center column 16 through influent conduit 18 and discharged into the flocculation compartment 56 through feed ports 90 in the center column.

Figure 7:
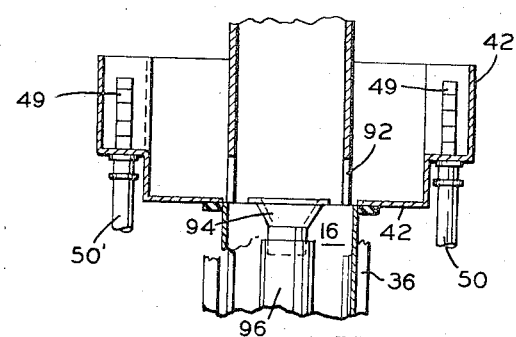
FIG. 7 is an enlarged sectional view of the sludge launder of FIG. 5.

As more clearly shown in FIG. 7, launder 42 communicates with the center column 16 through recirculation ports 92. In this embodiment, the center column 16 is also provided with a sludge recirculation conduit 96, preferably having a cone-shaped inlet portion 94, associated with said feedwell for receiving sludge therefrom.

Conduit 96 runs, essentially, the full length of column 16 and comunicates at its outlet end with sludge chamber 86 of the recirculation well 80.

As previously indicated, settled sludge on the floor 12, of tank 10 is picked up by sludge uptake conduits 50, 50′ and discharged into the rotating launder 42. The sludge in launder 42 passes through sludge recirculation ports 92 into the cone portion 94 of the sludge recirculation pipe 96 for discharge into the sludge chamber 86 of the recirculation well.

In this embodiment, treatment chemicals, if necessary, may be added to the recirculation system, preferably into chamber 86 by suitable conduits, not shown.

Figure 4:
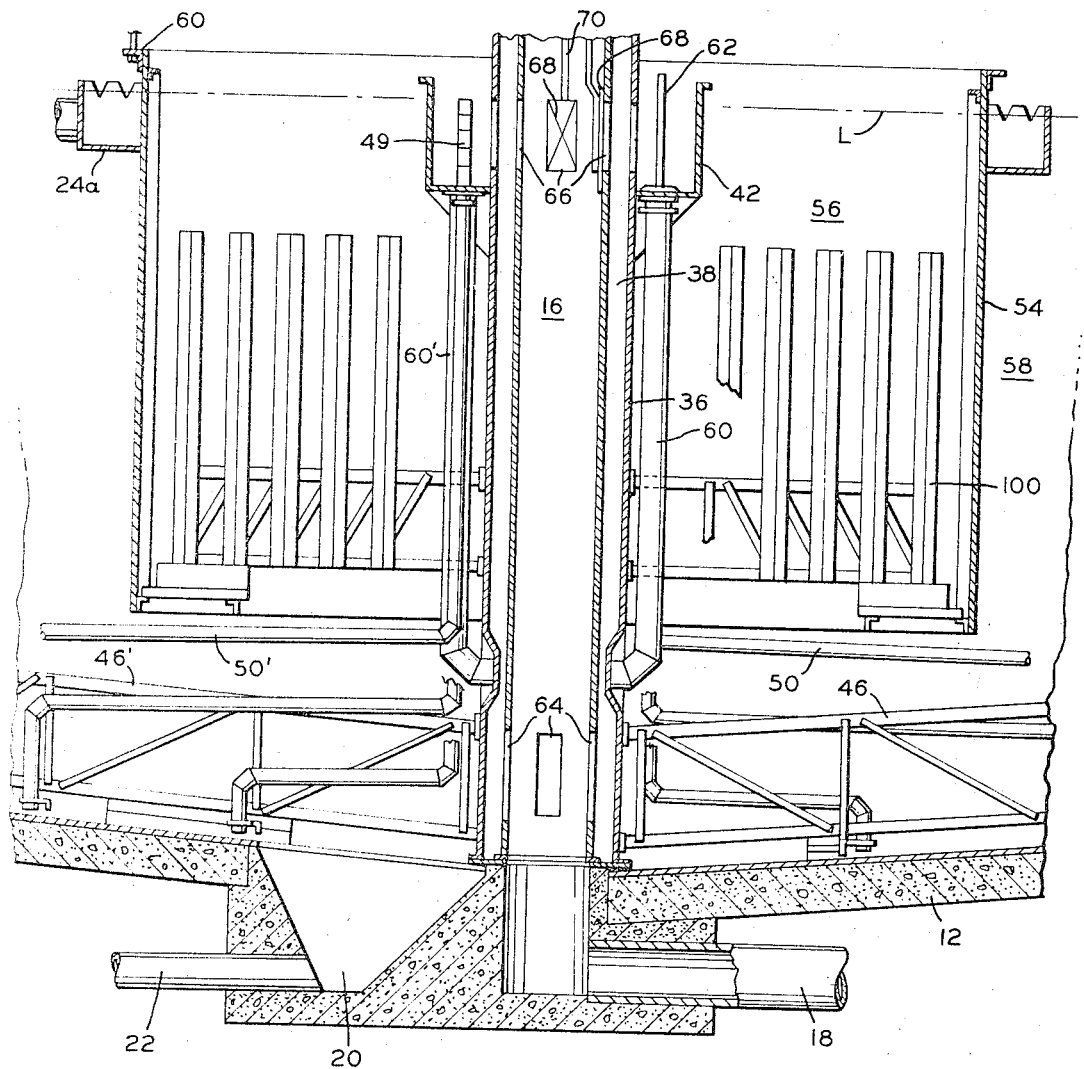
FIG. 4 is an enlarged vertical sectional view showing the central portion of a form of the apparatus of FIG. 1 provided with flocculation paddles.
Figure 8:
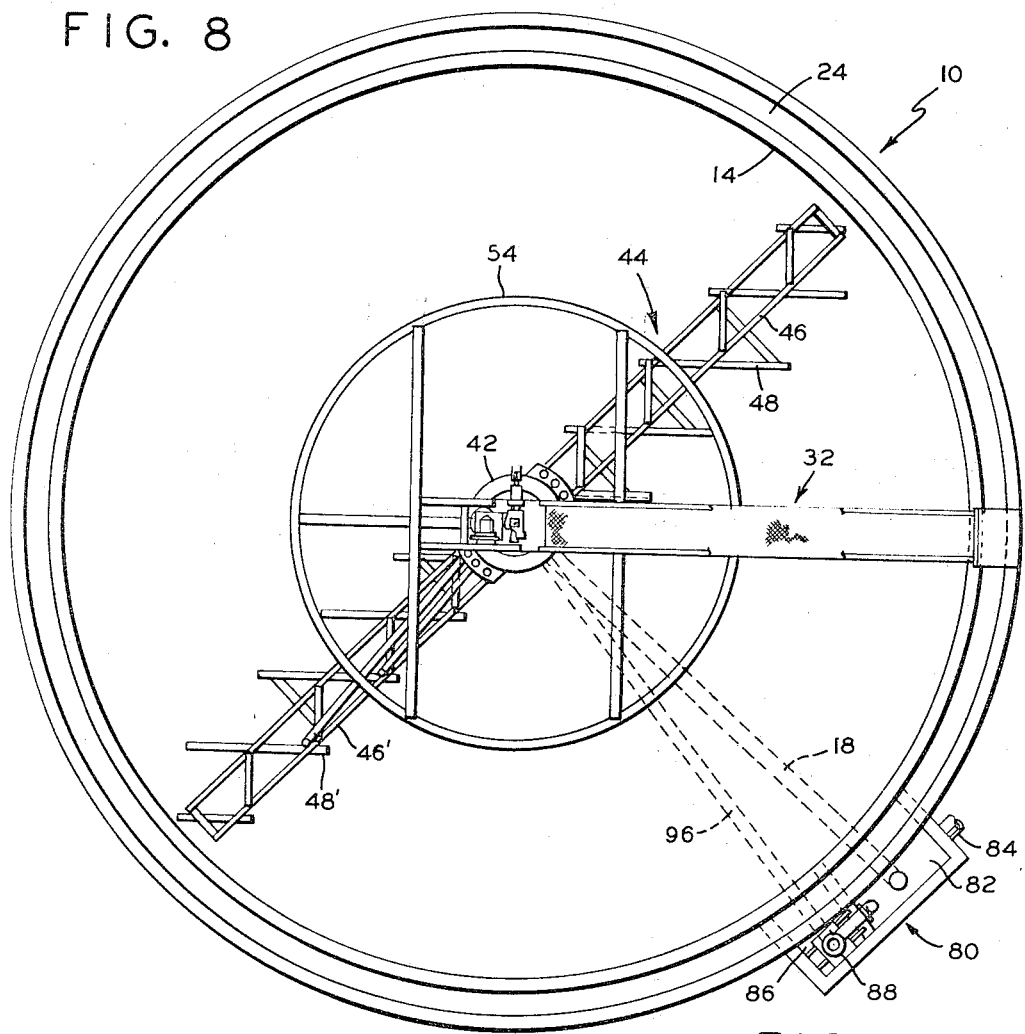
FIG. 8 is a plan view of the apparatus of FIG. 5.

FIG. 4 illustrates the embodiment of FIG. 1 provided with flocculating paddles 100. The flocculating paddles are preferably mounted onto column 36 and rotated therewith. Since, in this invention, the need for mechanical flocculation has been materially reduced, and in most cases completely eliminated, efficient flocculation is attained by rotating the paddles at a slower rate than required by the prior art. Therefore, in this invention, the flocculating paddles are rotated at the same speed as the raking structure thereby avoiding the need for a separate drive means.

In operation of the embodiments of FIGS. 1, 2 and 3, the raw liquor to be treated is introduced into tank 10 via conduit 18 under hydrostatic pressure and flows into the interior of column 16. With slide gate 68 of outlet port 66 in a fully closed position the raw liquor passes from the interior of column 16 into annular zone 38 through outlet ports 64 and flows upwardly into said annular zone 38 past the Venturi section 40.

The flow of liquor past said Venturi 40 produces a pressure drop in this section which causes sludge to be drawn from zone 72, 72′ of launder 42 through conduits 60, 60′, respectively, into the annular zone 38 to be mixed with the upflowing incoming feed liquor.

The withdrawal of sludge from launder 42 into zone 38 lowers the liquid level in said launder producing a pressure differential between the liquid level L, in tank 10 and the liquid level in launder 42 enabling sludge on the tank floor 12 to be withdrawn through plate conduits 50, 50′ into zone 72, 72′ respectively.

The feed liquor in zone 38 mixed with recirculated sludge flows up zone 38 through feed passage 74 of launder 42 into the flocculation compartment 56.

In compartment 56, because of the high concentration of previously settled sludge, flocculation of the mixture of fresh and previously settled solids is effected generally without any mechanical agitation causing adsorption and absorption of suspended and dissolved solids.

The flocculated solids pass under baffle 54 into the clarification compartment 58 wherein the flocculated material settles in "zone" settlement. In said clarification compartment, settled grit and excess flocculated material are raked towards sump 20 for discharge to waste while clarified effluent overflows weir 26 into effluent launder 24 for further treatment or use.

In this embodiment, it will be seen that the rate of recirculation of previously settled flocculated material from the tank floor into the raw liquor in zone 38 is dependent essentially on the pressure drop created by the flow of feed liquor past section 40 of zone 38, which, in turn, is controllable by gate valve 68 of port 66. Also the amount and nature of the sludge withdrawn through said conduits 50, 50′ is controllable by the settling in ring valve 49.

As indicated above, with slide gate 58 in a fully opened position, the incoming feed discharges through outlet ports 66 by-passing Venturi 40. With gate valve 68 partially opened, part of the feed liquor is forced past Venturi 40 effecting a reduction in pressure in this zone.

Therefore, withdrawal of previously settled sludge from launder 42 may be controlled to any desired rate by a settling of gate valve 68, which in turn, with a proper setting of ring valve 49 of conduits 50, 50′, controls the withdrawal of sludge from the tank bottom 12 through conduits 50, 50′.

In operation of the embodiment of FIGS. 5, 6, 7 and 8, the raw liquor is introduced into feed chamber 82 of the recirculation well 80 and mixed with recirculated sludge from chamber 86 by pump 88.

The withdrawal of sludge from sludge chamber 86 produces a pressure differential between the liquid level in chamber 86 and the liquid level in launder 42 enabling sludge to flow from said launder to said chamber 86. The flow of said sludge from launder 42 creates, in turn, a pressure differential between the liquid level in said launder and the liquid level L in tank 10 enabling sludge on the tank floor 12 to be withdrawn through uptake conduits 50, 50′ into launder 42.

The liquor to be treated, containing recirculated sludge, is introduced into tank 10 via conduit 18 under a hydrostatic pressure and flows up center column 16 into the flocculation chamber 56 through port 90.

In the flocculation chamber 56, as mentioned above, flocculation of the mixed raw and previously settled sludge is effected, causing adsorption and absorption of suspended and dissolved solids. Thereafter the flocculated solids pass into the clarification chamber for settlement.

In this embodiment, the rate of withdrawal of settled flocculated material from the tank floor is directly proportional to the rate at which pump 88 pumps sludge from chamber 86 to chamber 82. In turn, this pumping rate governs the amount of previously settled sludge recirculated into the incoming raw liquor.

From the foregoing description of the various embodiments of this invention, it is evident that the objects of this invention, together with many practical advantages are successfully achieved.

While the preferred embodiments of my invention have been described, numerous further modifications may be made without departing from the scope of the invention as defined by the appended claims. For instance, the apparatus of this invention, as shown in FIG. 1, may be provided with an additional overflow launder means 24a surrounding baffle 54 and communicating with launder 24 such as through a suitable conduit means 25. Also, in the embodiment as illustrated in FIG. 5 a cage member may be substituted for column 36 and flocculating paddles may also be provided in the flocculation compartment.

Therefore, it is to be understood that all matters herein set forth and as shown in the accompanying drawings are to be interpreted in an illustrative and not in a limiting sense.

I claim:

1. Apparatus for continuously clarifying liquids by flocculation and sedimentation comprising, a tank having a bottom and upstanding marginal walls; overflow outlet means for clarified effluent; underflow outlet means for settled sludge; a center pier uprising from the bottom of said tank and having a hollow stationary inner column and a rotatable outer member generally surrounding said inner column; cylindrical baffle means in said tank defining an inner flocculation compartment and outer clarification compartment; rake means attached to said outer member rotatably operable in said clarification compartment for progressively moving sludge on the tank bottom towards said underflow outlet; drive means for rotating said outer member; feed inlet means communicating with said inner column for introducing liquid to be treated into said tank; feed outlet means in said inner column communicating with said flocculation compartment for discharging said feed liquid therein; sludge launder means in said flocculation compartment mounted around the upper end of said outer member and rotatable therewith; a plurality of sludge uptake conduits mounted on said rake means for rotation therewith, said conduits terminating at their inlet ends at a predetermined level above the tank floor and at their outlet ends in said sludge launder; and sludge recirculation means communicating with said sludge launder for conveying previously settled sludge solids into the incoming raw feed for recirculation into said flocculation compartment whereby due to the removal of sludge from said launder a pressure differential is created in said tank between the liquid level in said clarification compartment and the sludge level in said launder enabling sludge to be withdrawn from said tank bottom through said uptake conduits into said launder.

2. Apparatus according to claim 1 wherein said outer member is a cylindrical column defining between said inner column and said outer column an annular flow compartment.

3. Apparatus according to claim 2 wherein said annular compartment is provided with constriction means effective to create a pressure drop in said annular compartment.

4. Apparatus according to claim 3 wherein said feed outlet means in said inner column is located below said constriction means.

5. Apparatus according to claim 3 wherein said sludge recirculation means communicates with said annular compartment at said constriction means.

6. Apparatus according to claim 1 wherein said tank is further provided with a sludge recirculation well operably associated therewith.

7. Apparatus according to claim 6 wherein said sludge recirculation well comprises a feed chamber communicating with said inner column for receiving raw liquid to be treated and a sludge chamber communicating with said sludge recirculation means for receiving previously settled sludge solids.

8. Apparatus according to claim 7 wherein said sludge recirculation well is provided with pump means for conveying previously settled sludge from said sludge chamber into said feed chamber.

9. Apparatus according to claim 8 wherein the rate of withdrawal of previously settled sludge solids is directly proportional to the rate at which sludge is conveyed from said sludge chamber to said feed chamber.

10. Apparatus for continuously clarifying liquids by flocculation and sedimentation comprising, a tank having a bottom and upstanding marginal walls; overflow outlet means in said tank for clarified effluent; a discharge sump in said tank for removing settled solids; a centrally disposed center pier uprising from the bottom of said tank and having a hollow stationary inner column and a rotatable outer column surrounding said inner column defining therebetween an annular flow compartment; drive means in said tank for rotating said outer column; constriction means in said annular compartment effective to produce a pressure drop in the area of said constriction by the liquid passing therethrough; outlet ports in said inner column at least below said constriction means communicating with said annular compartment for discharging feed liquor therethrough; cylindrical baffle means in said tank around said center pier defining an inner flocculation compartment and an outer clarification compartment; a sludge launder in said flocculation compartment mounted around the upper end of said outer column and rotatable therewith, said launder provided with feed passage means communicating between said annular compartment and said flocculation compartments; rake means in said clarification compartment mounted on the lower end of said outer column and rotatable therewith effective for progressively conveying settled sludge solids on the tank floor to said discharge sump; a plurality of sludge uptake conduits mounted on said rake means for rotation therewith, said conduits terminating at their inlet ends at a predetermined level above the tank floor and at their outlet ends in said sludge launder; sludge recirculating means operably associated between said sludge launder and said constriction means for conveying sludge solids from said launder into said annular compartment; and feed inlet means communicating with said stationary column for introducing liquid to be treated into said tank whereby the flow of feed liquor passed said constriction means in said annular compartment produces a pressure drop in said annular compartment at said constriction effective to draw sludge from said launder into said annular compartment to be mixed with said incoming feed thereby also creating a pressure differential in said tank between the sludge level in said launder and the liquid level in said tank enabling sludge to be withdrawn from said tank bottom through said uptake conduits into said launder.

11. Apparatus according to claim 10 wherein said inner column is provided with adjustable outlet port means above said constriction means effective to control the flow of the liquid pass said constriction means.

12. Apparatus according to claim 10 wherein the flocculation compartment is provided with flocculating paddles rotatably operable with said outer column.

13. Apparatus according to claim 10 wherein said sludge uptake conduits are provided with valve means for the controllable withdrawal of settled sludge from said clarification compartment.

14. Apparatus according to claim 13 wherein said sludge uptake conduits operate in concentric annular sections in said clarification compartment effective for the selective controllable withdrawal of sludge from said clarification compartment.

15. Apparatus for continuously clarifying liquids by flocculation and sedimentation comprising, a tank having a bottom and upstanding marginal walls; overflow means in said tank for clarified effluent; a discharge sump in said tank for removing settled solids; a centrally disposed center pier uprising from the bottom of said tank and having a hollow stationary inner column and a rotatable outer member generally surrounding said inner column, said hollow inner column accommodating a sludge recirculation conduit substantially coextensive therewith; drive means in said tank for rotating said outer member; cylindrical baffle means in said tank around said center pier defining an inner flocculation compartment and an outer clarification compartment; outlet port means in said hollow inner column for discharging feed liquid therethrough into said flocculation compartment; a sludge launder in said flocculation compartment mounted around the upper end of said outer member and rotatable therewith, said launder communicating with said sludge recirculation conduit in said inner column; rake means in said clarification compartment mounted on the lower end of said outer member and rotatable therewith effective for progressively conveying settled sludge on the tank floor to said discharge sump; a plurality of sludge uptake conduits mounted on said rake means for rotation therewith, said conduits terminating at their inlet ends at a predetermined level above the tank floor and at their outlet ends in said sludge launder; a sludge recirculation well operably associated with said tank having a feed chamber, communicating with said inner column, for receiving raw liquor to be treated and a sludge chamber, communicating with said sludge recirculation conduit, for receiving previously settled sludge solids; feed conduit means communicating with said feed chamber for feeding raw liquid to be treated into said recirculation well; and pump means for controllably transferring previously settled sludge from said sludge chamber to said feed chamber effective to create a pressure differential between the liquid level in said tank and the sludge level in said sludge chamber thereby enabling sludge to flow from said tank bottom to said sludge chamber.

16. Apparatus according to claim 15 wherein the upper ends of said uptake conduits are provided with valve means for controlling the withdrawal of settled sludge from said clarification compartment.

17. Apparatus according to claim 15 wherein said sludge uptake conduits operate in concentric annular sections in said clarification compartment effective for the selective controllable withdrawal of sludge from said clarification compartment.

18. Apparatus according to claim 15 wherein said outer member is a cage member.

19. In a process for treating liquids containing suspended solids, in a tank provided with a flocculation zone wherein said solids are flocculated in the presence of previously settled solids and a clarification zone wherein the thus flocculated solids are permitted to settle whereby clarified liquid is discharged as overflow from said tank and settled sludge solids are discharged from the bottom of said tank, the improvement comprising continuously feeding raw liquid to be treated into said flocculation zone wherein suspended solids are contacted with each other as well as with recirculated solids while maintaining relatively gentle agitation sufficient to promote floc formation, selectively recirculating a predetermined portion of previously settled sludge solids derived directly from concentric annular sections in said clarification zone into said flocculation zone along with said raw feed to effect flocculation and sedimentation of said solids, and discharging settled solids from the bottom of said tank.

20. Process according to claim 19 wherein the solids concentration in said clarification zone is maintained in the range at which zone settling occurs.

21. Process according to claim 19 wherein the solids concentration in said flocculation zone is maintained in the range which effects flocculation of said suspended solids.

22. Process according to claim 19 wherein the sludge solids withdrawn from said clarification zone are conveyed to a sludge holding zone operably associated with said tank prior to recirculation into said flocculation zone.

23. Process according to claim 22 wherein the flow of settled sludge solids from said clarification zone to said sludge holding zone is dependent on the pressure differential created between the liquid level in said clarification zone and the sludge level in said sludge holding zone.

References Cited

UNITED STATES PATENTS

| | | | |
|---|---|---|---|
| 2,506,927 | 5/1950 | Kelly | 210—197 |
| 2,669,357 | 2/1954 | Kivell et al. | 210—197 |
| 2,775,556 | 12/1956 | Kelly et al. | 210—528 |
| 3,152,982 | 10/1964 | Pagnotti | 210—15 X |

FOREIGN PATENTS 489,452  7/1938  Great Britain.

OTHER REFERENCES

Fair, G.M. et al.: Water Supply and Waste-Water Disposal, 1954, John Wiley and Sons, New York, pp. 708–710 relied on.

MORRIS O. WOLK, *Primary Examiner.*

MICHAEL E. ROGERS, *Examiner.*